July 9, 1963   C. V. DAHLIN   3,096,836
DRILL BITS AND CUTTING INSERTS THEREFOR
Filed April 24, 1959   2 Sheets-Sheet 2
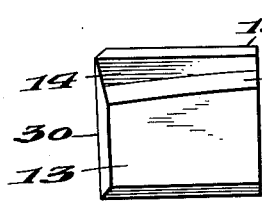
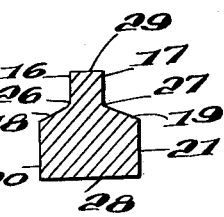
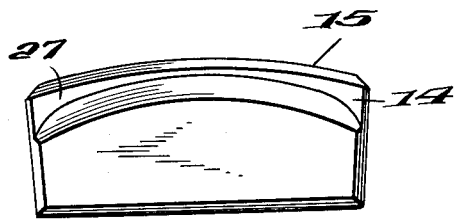
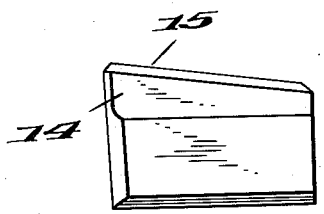
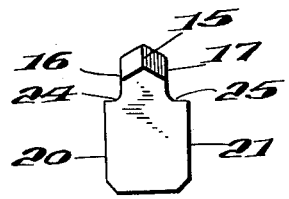
INVENTOR
CURT VILHELM DAHLIN,
BY Pierce, Scheffler & Parker
ATTORNEYS 3,096,836
DRILL BITS AND CUTTING INSERTS THEREFOR
Curt Vilhelm Dahlin, Sandviken, Sweden, assignor to Sandvikens Jernverks Aktiebolag, Sandviken, Sweden, a corporation of Sweden
Filed Apr. 24, 1959, Ser. No. 808,617
1 Claim. (Cl. 175—410)

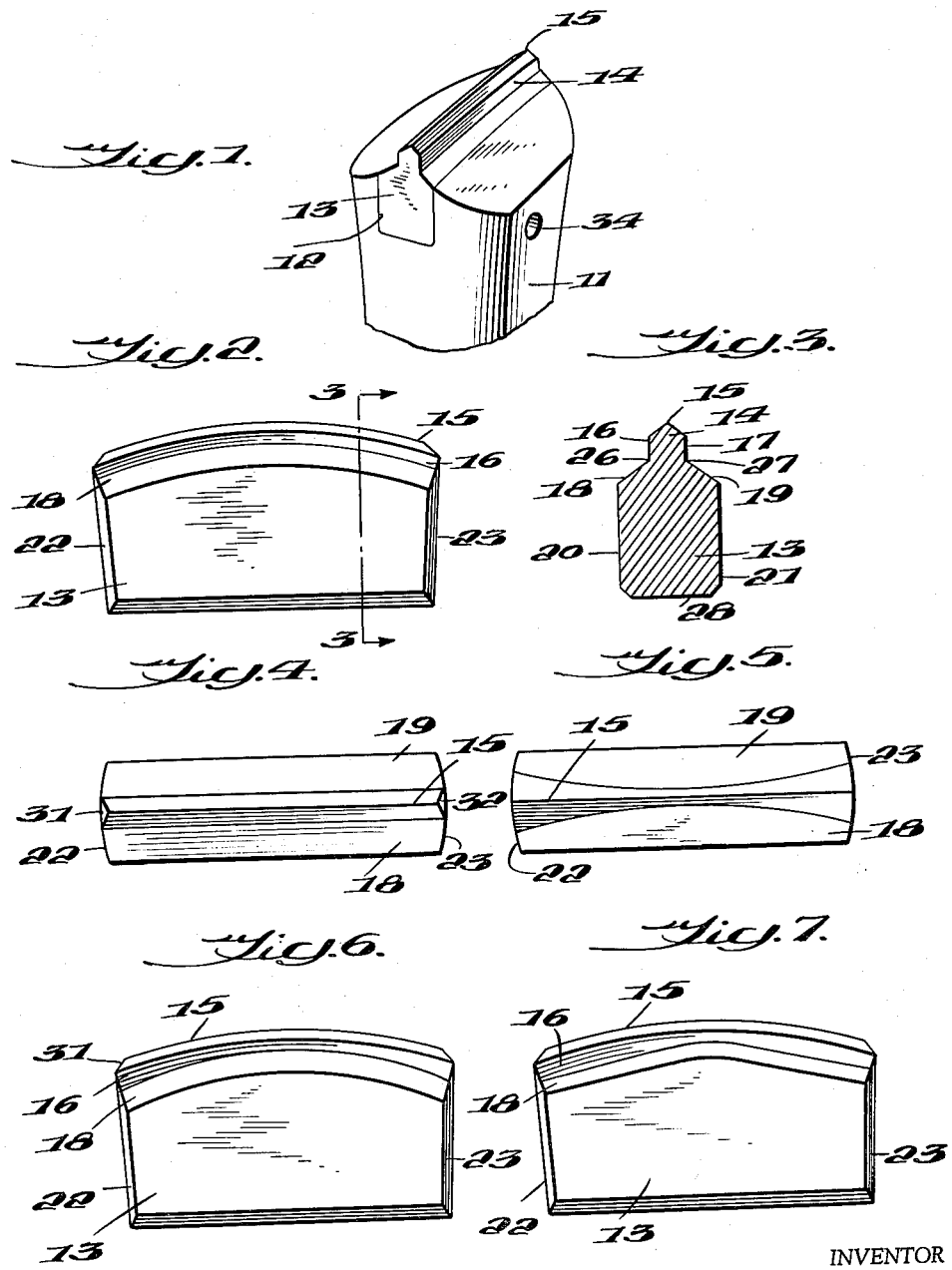

The present invention relates to drill bits for percussive drilling which are provided with one or more so-called hard metal cutting inserts and to the cutting inserts for such drill bits. The invention embraces drill bits which may be either integral with or detachable from drill rods.

Drill bits with hard metal cutting inserts heretofore employed have required regrinding for the complete utilization of their drilling potentialities. Otherwise the use of a worn drill bit will give rise to excessive stresses resulting in breakage and in a reduced drilling rate. In drilling some species of rock the wear occurs principally at the cutting edge of the drill bit, i.e., the cutting edge of the insert and is called "height wear" while in drilling other species of rock such as quartzite the wear occurs principally at the corners and end surfaces of the inserts and is called "diameter wear." Diameter wear is associated with a phenomenon called counter-taper which creates great stresses in the cutting inserts and frequent breakage.

Generally a drill bit has to be reground several times before it is worn out and discarded.

Regrinding is objectionable not only because of the slowing up of the drilling rate incident to the changing of drill bits but also because transporting the drill bits with or without their drill rods to the grinding station and the grinding operation itself involve a considerable expense.

The present invention is designed to obviate regrinding and to provide drill bits capable of a high drilling rate and of drilling a number of short holes or a correspondingly long hole at an acceptable drilling rate without regrinding. The cutting inserts in accordance with the present invention are so-shaped that they not only do not require regrinding but also effectively resist the stresses to which they are subjected in percussive drilling.

The cutting inserts in accordance with the present invention are characterized in that they consist essentially of a shank or body portion and a relatively narrow ridge shaped cutting edge portion. The cutting edge portion extends across all or substantially all of the width of the body portion and generally is symmetrically positioned with respect to the base.

The drill bits of the present invention may have a single insert extending diametrically across the axis thereof or it may be provided with a plurality of inserts, for instance, four, arranged in the form of a cross as is well known in this art. Also as is well known in this art the cutting inserts may be sintered products formed of a hard material such as tungsten carbide and a bonding material such as cobalt and/or other metal of the iron group. The invention embraces also cutting inserts made of ceramic products such as alumina with or without a bonding material. As has been indicated above the present invention resides in the shape of the cutting inserts and particularly in the shape of the edge portion thereof and follows conventional practice with regard to the composition and arrangement of the inserts.

The cutting edge portion or ridge may have a straight or curved edge or may be formed of two straight edges which meet at an angle to each other and the ridge itself may be of uniform thickness and height or it may be higher and/or thicker adjacent the outer end thereof, i.e., adjacent the periphery of the drill bit. The edge may lie in a plane perpendicular to the axis of the bit or may be inclined either upwardly or downwardly toward its end or ends. The cutting inserts may extend across the axis of the bit or from the axis thereof to the periphery or its inner end may terminate short of the axis leaving a central space which may contain the orifice for flushing fluid, all as will appear more fully hereinafter.

The invention is further described and illustrated with reference to the accompanying drawings in which FIG. 1 is a perspective view of a drill bit having a single cutting insert.

FIG. 2 is a side elevational view of the cutting insert of FIG. 1,

FIG. 3 is a cross-section on the line 3—3 of FIG. 2,

FIG. 4 is a top plan view of the cutting insert of FIG. 1,

FIG. 5 is a top plan view of a modification of the cutting insert shown in FIG. 1, FIG. 6 is a side elevational view of another modification of the cutting insert shown in FIG. 1, FIG. 7 is a side elevational view of another modification of the cutting insert shown in FIG. 1, FIG. 8 is a side elevational view of a form of cutting insert adapted for use when four inserts are arranged in the form of a cross, FIGS. 9 and 10 are cross sections similar to FIG. 3, showing other possible shapes of the cutting edge portion of the cutting insert, FIG. 11 is a front elevational view of another modification of the cutting insert shown in FIG. 1, and FIGS. 12 and 13 are a front and end view respectively of a modification of the form of cutting insert shown in FIG. 8.

Referring to the drawings, 11 is the drill bit body which as stated above may be integral with or detachable from a drill rod (not shown). Since the drill bit body is often of substantially the same shape regardless of the shape of the cutting insert which is mounted in it only a single drill bit body 11 has been shown in the drawings.

It is noted that the drill bit body contains an orifice 34 leading to a flushing channel (not shown) which is a well known expedient. It is noted further that the drill bit body is larger than the insert and contains a groove 12 to receive the cutting insert. The side surfaces of the groove 12 may be and are shown as being plane and parallel to each other and to the axis of the bit and the bottom surface of the groove 12 is shown as being plane and perpendicular to the axis of the bit. Other groove shapes, known in the art, are within the scope of the present invention which is concerned only with the shape of the edge portion of the cutting inserts and not with the shape of the body portion thereof or the manner in which the cutting inserts are attached to the drill bit body. The insert may be secured to the drill bit body by brazing or in any other suitable way known in this art. It is noted further that the surfaces of the drill bit body adjacent to the insert preferably are plane surfaces which are inclined outwardly and downwardly away from the insert, this being also a well known expedient. Still another well known feature of applicant's drill bit body is that the head portion thereof adjacent to the cutting face is somewhat larger than the lower or shank portion.

The cutitng insert, as appears in FIGS. 1–4 consists of the body portion 13 and an edge portion 14 which may be provided with a relatively sharp cutting edge 15 as shown in FIGS. 1–9 and 11–13, or may be a plane surface 29 as shown in FIG. 10. The present invention may employ the expedient which is known in the art and therefore has not been illustrated that the cutting insert may be in two or more parts fitted together insead of being unitary.

In the cutting insert as illustrated in FIGS. 1 to 4 the edge portion 14 is in the form of a relatively thin or narrow ridge extending across the upper face of the body portion 13 and its plane, parallel side surfaces 16 and 17 extend downwardly to the surfaces 18 and 19 which in turn extend outwardly and downwardly to join the side surfaces 20 and 21 of the body portion 13 of the insert. Thus the surfaces 16 and 17 join the surfaces 18 and 19 at lines 26 and 27. 28 is the base or bottom surface of the insert and as shown is a plane surface perpendicular to the axis of the insert. The sharp corners formed at the junction of the surfaces 20 and 21 with the bottom surface 28 may be chamfered as shown in FIGS. 2 and 3 but this is not essential. As shown in FIG. 1 and more clearly in FIG. 2 the edge 15 and the surfaces 16, 17, 18 and 19 are slightly curved lengthwise of the insert so that the edge portion 14 is slightly arched.

The structure described above in connection with FIGS. 1–4 may be modified as shown in FIGS. 9 and 13 while retaining its essential characteristic as being a relatively narrow ridge 14 extending across the face of the body portion 13 of the insert. Thus in FIGS. 9 and 13 it appears that the side surfaces 16 and 17 of the ridge 14 may merge gradually into the curved surfaces 24 and 25 which in turn extend downwardly and outwardly to the side surfaces 20 and 21. It is apparent however that in all of these embodiments the edge portion 14 is in effect a relatively narrow ridge extending across the face of the body portion 13 of the insert.

Whatever the cross sectional shape of the cutting edge portion of the insert, i.e., as shown in FIGS. 3, 9, 10, and 13, the thickness of the edge portion adjacent to the cutting edge 15 should be within the range from 2 to 5 mm. and preferably within the range from 3 to 5 mm., e.g., 4 mm.

The cutting edge portion or ridge 14 may be of uniform height as shown in FIG. 2, or it may, as shown in FIGS. 6 and 7, be of greater height adjacent both ends than in the middle. This shape tends to compensate for the greater wearing of the inserts adjacent the ends thereof, i.e., adjacent the periphery of the drill bit. For the same reason it is advantageous as shown in FIG. 5 to make the ridge 14 thicker adjacent the ends than in the middle, and it is of course possible to employ both expedients, i.e., the ridge may be both higher and thicker adjacent the ends thereof than in the middle.

The height of the ridge 14 measured from the cutting edge 15 or 29 to the limting surfaces 18 and 19 as shown in FIGS. 3 and 10 should be within the range from 2 to 6 mm., preferably 3 to 5 mm., e.g., 3 mm., at least adjacent the ends thereof, i.e., adjacent the end surfaces 22 and 23. In the modifications illustrated in FIGS. 6 and 7 the ridge may be very small or practically non-existent adjacent the middle thereof. In the form illustrated in FIG. 9 in which the side surfaces 16 and 17 merge into the curved surfaces 24 and 25 the ridge may have a greater height than that described above with reference to the ridge shown in FIGS. 3 and 10. Usual bit diameters are 22–45 mm., e.g., 30–36 mm. It is noted that in the modification shown in FIG. 3 in which substantially plane side surfaces 16 and 17 join the substantially plane limiting surfaces 18 and 19 the junctures, instead of being straight lines 26 and 27 may be curved surfaces on a radius of say about 3 mm.

The body portion 13 of the insert which generally has plane parallel sides 20 and 21 preferably is of the customary size of cutting inserts, i.e., 8 to 12 mm., e.g., 10 mm., which is of course considerably thicker than the thickness of the ridge 14. The height of the body portion 13, i.e., from the base 28 up to the ridge 14 may be from 12 to 16 mm. for drilling certain hard species of rock and from 5 to 12 mm. for drilling certain other less hard species. The height of the body portion 13 is not critical and as indicated may vary within the range from 5 to 16 mm. depending upon the intended use.

The limiting surfaces 18 and 19 and the edges 15 and 29 (FIGS. 1–8, 10, 11 and 12) may be straight as shown in FIG. 8 or curved as shown in FIGS. 1 and 2 or the surfaces 18 and 19 may be formed of two intersecting plane surfaces as shown in FIG. 7 and the surfaces 18 and 19 may be so shaped with respect to the shape of the ridge 14 as to provide a ridge of uniform height (FIG. 2) or preferably of greater height at the ends than at the middle (FIGS. 6 and 7). In FIG. 8 the edge 15 is straight while the surfaces 18 and 19 are inclined downwardly toward the peripheral end surface 30.

The modifications shown in FIGS. 9, 11 and 12 also preferably are so shaped that the ridge 14 has greater height adjacent the ends thereof or adjacent the periphery of the drill bit than adjacent the axis of the drill bit. This shape gives the drill bits a guiding action and tends to produce holes which are more nearly circular in cross section besides giving drill bits having longer wearing qualities. In the modification illustrated in FIGS. 12 and 13 not only is the ridge 14 higher adjacent the periphery of the drill bit than adjacent the axis of the bit but the edge 15 instead of being bow-shaped as in FIGS. 1–7 or straight and perpendicular to the axis of the bit as in FIG. 8, is inclined upwardly toward the periphery of the bit. It will be understood that although the cutting insert shown in FIGS. 12 and 13 is designed for use in a cross arrangement of four inserts in which each insert extends radially from the axis of the bit this same shape may be embodied in a symmetrical cutting insert designed as in FIG. 1 to extend across the face of the bit.

The ends of the ridge 14 may be chamfered at 31 and 32 as shown in FIG. 4.

Although the ridge 14 is shown in all of the drawings as being symmetrical with respect to the body portion 13 of the cutting insert it is within the scope of the invention to extend the ridge 14 more or less diagonally across the front or upper end of the body portion 13.

The modification illustrated in FIG. 9 in which the side surfaces 16 and 17 of the ridge 14 are joined to the side surfaces 20 and 21 of the body portion 13 of the insert by the curved surfaces 24 and 25 represents an extension of the expedient described above of rounding the corner between the surfaces 16, 17 and the surfaces 18, 19. This embodiment conforms to the idea of a relatively narrow cutting ridge integral with and protruding from the upper end of the body portion of the insert.

The entire height of the cutting insert from base 28 to edge 15 or 29 may be from 14 to 18 mm., preferably from 15 to 17 mm. The height of the body portion 13 may be from 40 to 60%, preferably about 50% of the entire height of the insert. The thickness of the insert adjacent the cutting edge 15 should be less than half of the thickness of the body portion 13.

In the use of the form of cutting insert shown in FIGS. 12 and 13 with three or more of such inserts radiating from the center of the drill bit cutting face and with the higher ends of the cutting edges 15 adjacent to the periphery of the drill bit face a counter peg is formed at the bottom of the drill hole which tends to guide the drill bit and to form a round and straight hole. Another advantage of this form of insert is that the cutting ridge may become thicker as it wears away adjacent the periphery where the wear is greatest. The transition between the side surfaces of the ridge and the side surfaces of the body of the insert may be, as shown in FIGS. 12 and 13 or they may be concave surface or a plurality of surfaces in different planes connected to each other by steps.

In the embodiment of the invention illustrated in FIG. 11 the ridge 14 is shown as having a curved, i.e., convex edge and as having greater height adjacent to the periphery than adjacent the axis of the drill bit and the height increases more rapidly as one approaches the periphery. The difference in height may be from 1.5 to 4 mm., preferably from 2 to 3 mm. in a drill bit having a diameter of from 22 to 45 mm., e.g., 30–36 mm.

All of the cross-sectional shapes of the cutting ridge described and illustrated have been found to exhibit the advantageous characteristics described, i.e., they are self grinding or do not require regrinding until the ridge is completely or practically completely worn away. At this point the inserts are generally regarded as being worn out and are discarded. The only regrinding which may be contemplated is a regrinding to form a new cutting ridge or to form a cutting insert of the conventional shape.

The cutting inserts of the present invention may of course embody known features. For instance the insert or at least the cutting edge portion may be made of different grades of hard material, e.g., the portion thereof adjacent to the axis of the drill bit may be made of a more wear resistant and less tough grade of hard metal and the portion thereof adjacent to the periphery may be made of a tougher and less wear resistant grade of hard metal or vice versa and different inserts in the same drill bit may vary in toughness and wear resistance.

I claim:

A cutting insert for a drill bit consisting of a body portion and a cutting edge portion, said body portion having a substantially plane bottom surface, substantially plane parallel side surfaces which are substantially perpendicular to said bottom surface, a top surface and end surfaces connecting said bottom, top and side surfaces, said cutting edge portion being in the form of a relatively narrow ridge which extends upwardly from said top surface of said body portion away from said bottom surface, said ridge extending along said top surface of said body portion, the thickness of said body portion between said side surfaces being at least twice the thickness of said ridge in the direction perpendicular to said side surfaces, the thickness of said ridge being within the range from 2 to 5 mm. and being such that a good cutting edge is maintained until said ridge is completely worn down, said ridge having a cutting edge surface opposite to said bottom surface and side surfaces which are substantially perpendicular to said bottom surface and merge through curved surfaces into the top surface of said body portion, the end portions of said ridge being thicker in the direction perpendicular to said side surfaces than the intermediate portion thereof, said end portions being situated between the planes of said side surfaces.

References Cited in the file of this patent

UNITED STATES PATENTS

| | | |
|---|---|---|
| 1,786,413 | Kennedye | Dec. 23, 1930 |
| 1,969,040 | Sanderson | Aug. 7, 1934 |
| 2,649,284 | Letts | Aug. 18, 1953 |
| 2,653,010 | Curtis | Sept. 22, 1953 |
| 2,735,656 | Hoglund et al. | Feb. 21, 1956 |
| 2,889,138 | Haglund | June 2, 1959 |

FOREIGN PATENTS

| | | |
|---|---|---|
| 86,308 | Norway | Oct. 17, 1955 |
| 657,432 | Great Britain | Sept. 19, 1951 |
| 669,628 | Great Britain | Apr. 2, 1952 |
| 707,021 | Great Britain | Apr. 7, 1954 |
| 827,482 | Germany | Jan. 10, 1952 |